Patented Sept. 27, 1938

2,131,374

UNITED STATES PATENT OFFICE 2,131,374

DOLOMITIC MAGNESIUM CARBONATE COMPOSITION AND METHOD OF PREPARATION

Bertrand B. Grunwald, deceased, late of Alameda, Calif., by Dorothy H. Grunwald, administratrix, Alameda, Calif.

No Drawing. Application August 17, 1936, Serial No. 96,474

11 Claims. (Cl. 25—156)

The invention relates to magnesium carbonate compositions of the type suitable for insulating purposes, and more particularly to an improved composition of this character made from dolomitic material as the source of raw material, in which the compounds of calcium derived from the dolomitic material are not removed or separated for the purpose of providing a final product of the requisite degree of lightness, strength and insulating properties, but remain in the final product, and also to an improved process for producing such composition whereby the composition has the property of self or hydraulically setting without shrinkage. This application is a continuation in part of the co-pending application Serial No. 717,077, filed March 23, 1934.

Magnesium carbonate compositions are used in sound and heat insulating and similar products, and although they can be made directly from magnesite or other sources consisting essentially of magnesium compounds, the source of raw material, in this country at least, is primarily true dolomite or similar dolomitic material such as dolomitic limestones, containing both magnesium and calcium compounds, primarily in the form of carbonates. This is so because the supply of dolomitic material in this country is much greater than that of material composed primarily of magnesium compounds; the latter material being commercially available only on the west coast of the United States in the States of California and Washington. Practically 85% of the magnesium carbonate compositions manufactured in this country are made from dolomitic material as the source.

For use in insulating products, magnesium carbonate compositions must meet certain commercial specifications as to weight, strength and insulating properties, the latter, of course, being partially a function of the weight because the more dense the product the less porous it will be.

In order to satisfy such specifications, other commercial processes require that the calcium compounds be eliminated in the preparation of the final magnesium carbonate composition when dolomitic material is the source of raw material. Such elimination step obviously involves considerable expense, and as a result increases the cost of manufacture of the product from dolomitic material as the source.

In the preparation of the magnesium carbonate composition by other processes, it is the general practice to gas an aqueous suspension of calcined dolomitic material with carbon dioxide-containing gas to precipitate calcium carbonate which remains insoluble. Magnesium carbonate also precipitates out, but the gassing is continued to such an extent as to convert the magnesium compounds to form magnesium bicarbonate which is water soluble, to thus enable the insoluble calcium carbonate to be separated from the magnesium bicarbonate solution by filtration or other suitable way. Subsequently, a precipitate of basic magnesium carbonate is obtained by heating the solution of the magnesium bicarbonate.

In such other methods, it is necessary in order to form the resultant magnesium carbonate in blocks or slabs of the desired shape and size, to mold the product in suitable forms under relatively high mechanical pressure because the magnesium carbonate lacks self-setting properties i. e., it cannot undergo a hydraulic set. This molding equipment is expensive to maintain and operate as well as to construct. Furthermore, because of the pressure applied during the molding, the product is compacted and consequently made more dense than would occur in a corresponding product having self-setting properties. This is another reason, why, in addition to the greater weight of the calcium carbonate compared to that of magnesium, the calcium compounds have to be removed in other present commercial processes.

The invention is designed to overcome the above described problems heretofore encountered in the manufacture of magnesium carbonate compositions from dolomitic material as the source, and has as objects among others, the provision of an improved:

(1) Light weight, yet strong magnesium carbonate composition from dolomitic material as the source, in which substantially all of the calcium occurring in such source in the form of a compound, remains in the final composition or product in the form of a calcium compound;

(2) Composition, of the character related, having self or hydraulic setting properties;

(3) Composition, of the character related, having improved insulating properties, and which can be economically produced; and (4) Process for obtaining such composition from dolomitic material.

Other objects of the invention will become apparent from a perusal of the following description thereof.

In general, it has been found that during gassing of an aqueous suspension of calcined dolomitic material, with carbon dioxide-containing gas, calcium carbonate is first formed as a precipitate, and then upon continued gassing, a precipitate of comparatively thin, needle-like crystals of a carbonate of magnesium is formed. If a slurry containing the precipitated calcium carbonate and the thin, needle-like carbonate of magnesium crystals is cast or poured into a form or mold, the composition will set in a quiescent state without application of mechanical pressure thereto, to provide the strong, and light weight self-setting product of the invention. The setting in the mold is enhanced by application of heat.

In other words, it has been found that when the described aqueous suspension of calcined dolomitic material is gassed with carbon dioxide-containing gas to the point where, in addition to the insoluble calcium carbonate precipitate, there is formed a carbonate of magnesium in the form of comparatively thin, needle-like crystals, especially crystals resulting from the reaction of the carbonate radical with the magnesium ion in an aqueous vehicle, the resulting composition has self or hydraulic setting properties rendering it unnecessary to mold the composition under pressure to form slabs or blocks. Thus, compacting of the material does not obtain, which, in other methods, increases the density of the final product, thereby necessitating the removal of the calcium compounds in order to provide a product of the requisite strength, lightness and insulating qualities.

Although the dolomitic magnesium carbonate composition of the invention has the property of self-setting in a quiescent state without application of pressure thereto, and this is the manner employed by this invention for producing the product, it will also set if pressure is applied as in other methods and still produce a stronger product than could be obtained by such other methods. Inasmuch as pressure molding is necessary to produce a satisfactory product by other methods and because pressure may be applied to the composition of the invention but is not necessary, the expression "independent of pressure" is employed hereinafter to describe that the composition of the invention has self-setting properties not conditioned on pressure.

The self-setting principle is imparted to the composition by the particular nature of the carbonate of magnesium crystals formed during the gassing with the carbon dioxide-containing gas; one of the important factors being to avoid as much as possible transformation of the water insoluble carbonate of magnesium to the water soluble magnesium bicarbonate by the addition of excess carbon dioxide. If this were done to a material extent, magnesium carbonate could only be obtained again by heating which destroys the self-setting properties. The Canadian Patent No. 328,196, granted December 6, 1932, discloses the method of obtaining a self-setting carbonate of magnesium where a straight magnesium compound, such as magnesite, is the source of raw material.

It is desirable, during the gassing of the aqueous suspension of the magnesium and the calcium hydroxides which are formed by reaction between the water and the calcined dolomitic material which, because of the calcining, consists essentially of calcium and magnesium oxides, and especially during formation of the needle-like crystals of the carbonate of magnesium after the calcium carbonate is precipitated, that the reaction be carried on under vigorous or excessive agitation, either mechanical or that obtained by the gassing with the carbon dioxide-containing gas or both. Such agitation is preferable to obtain complete reaction between the magnesium and carbonate ions, and to form as small and as thin crystals of the carbonate of magnesium as can be practically obtained because the smaller and thinner the crystals, the stronger the final product. Agitation enhances the formation of the desired type of crystals. It is believed that with small thin crystals there is a greater interlacing thereof to provide a firmer bonding of the calcium carbonate by the carbonate of magnesium upon setting of the composition.

Also for best results, the reaction should be so controlled, in addition to the agitation, as to convert substantially all of the magnesium compounds present in the reacting medium, to the described crystalline carbonate of magnesium, to thereby obtain a maximum yield of the comparatively thin, needle-like carbonate of magnesium crystals from the magnesium source. This is so because the presence of other magnesium salts admixed with the crystalline carbonate of magnesium impairs the self-setting properties of the composition and the strength of the final product, while the presence of magnesium bicarbonate solution retards setting and impairs strength.

Another important factor in obtaining the proper type of comparatively thin, needle-like carbonate of magnesium crystals having self-setting properties, is temperature control prior to the setting of the composition in molds. At too high a temperature prior to molding, the crystals are altered or transformed from crystals of comparatively thin, needle-like character to comparatively fat crystals which do not possess satisfactory self-setting properties. Therefore, during formation of the carbonate of magnesium crystals by the carbon dioxide-containing gas, the temperature should be controlled to avoid this transformation.

Subsequent to the precipitation of the water insoluble calcium carbonate which remains practically insoluble irrespective of how long the gassing is continued, and after formation of the self-setting carbonate of magnesium needle-like crystals in the aqueous vehicle, excess water is removed by decantation or any other suitable method; and the remaining aqueous slurry, containing calcium carbonate admixed with the carbonate of magnesium crystals, is ready for setting. After such slurry is prepared, and during the period prior to the step of setting the slurry, agitation should be avoided as much as possible because such agitation will increase the density of the final product and lessen the bonding power of the carbonate of magnesium crystals during setting thereof. In the setting operation, the described slurry is cast or poured directly into molds, which are preferably unperforated; and the molds are merely heated for a length of time and at a temperature sufficient to set the slurry or sludge to a firm cake. Agitation of the composition in the molds, is avoided because such agitation will impair the setting property of the carbonate of magnesium crystals. Hence, the setting in the molds is accomplished with the composition in a quiescent state.

The composition does not shrink upon setting and no pressure need be applied to the composition. Consequently, the density of the final product is governed by the quantity of water left in the slurry which is poured into the molds. During the setting, it is believed that carbon dioxide gas is evolved; and microscopic observation shows that the carbonate of magnesium crystals which were originally all comparatively thin or fine, needle-like crystals, now consist essentially of a mixture of two crystal forms. Some of the needle-like crystals remain, but a new, very small crystal appears. Such new crystal tends to cluster into grapelike groups, or to adhere to the surface of the needle-like crystals. This probably accounts for the great strength of the final product, which breaks with a clean or conchoidal fracture in contradistinction to the product produced by other processes, which mushes upon being broken, thus indicating that the product of the invention is bonded by virtue of interlacing of the crystals. Because of the evolution of the carbon dioxide and the formation of the new crystals, it is believed that a reaction probably occurs in which some of the carbonate of magnesium is converted to magnesium oxide or magnesium hydroxide, thus forming a light type of magnesium carbonate which serves as the bonding medium for the calcium carbonate in the admixture.

No pressure is required to compact or mold the composition, as the composition sets in a quiescent state, but, as previously explained, pressure molding may be employed and still produce a superior or a special dense product for certain uses. However, such pressure molding is preferably omitted inasmuch as it would increase the density of the final product which, as previously explained, is heavier, than would otherwise be the case, by the presence of the calcium carbonate. The temperature applied to the molds during the setting should not be too high nor applied too rapidly, because, although the product will set, the evolution of gas would be so fast as to leave the final product full of gas holes. Neither should the temperature be too low, because then the setting would, generally speaking, be too slow. A suitable temperature range is substantially from 60° C. to 90° C. At this temperature range, the setting to a hard cake will usually occur in from one to three hours; the time varying of course with the temperature actually applied, and also with the character of the composition resulting from the particular dolomitic material employed. Preferably, the heating of the composition in the molds to facilitate the setting, is obtained by placing the molds in a chamber containing steam at the proper temperature.

The composition sets normally without shrinkage, which is important, because if material shrinkage were to occur, then of course its final shape could not be fixed by the mold and wasteful trimming would have to be employed to produce the desired shaped block or slab. Also, by not shrinking, the density of the composition is not increased during the setting thereof. This is important for controlling the final weight of the product, as determined by the original amount of water which is left in the slurry. Under some circumstances, slight shrinkage of the composition might occur, but not as much as the shrinkage which occurs in other commercial processes wherein mechanical pressure molding of the composition is absolutely necessary to produce a satisfactory product; it of course being understood that in the other commercial processes, where dolomitic material is used as the source of raw material, the calcium compounds are removed, as the molded product consists essentially of magnesium carbonate instead of the admixture of calcium carbonate with the carbonate of magnesium which the method allows.

After having set in the molds, the blocks or slabs which are formed are self-supporting before they are dried. Blocks or slabs formed in other commercial processes where pressure molding is employed and which consist essentially of magnesium carbonate without calcium carbonate, are not self-supporting, and consequently, have to be supported in frames during drying thereof. The method of the invention, therefore, eliminates the necessity of having to provide such frames to support the molded products. Upon removal of the slabs or blocks from the molds, they are next dried in the usual manner heretofore employed for drying the mechanically molded product, except that no frames are needed.

Such drying is accomplished usually in conventional drying ovens, at a temperature ranging from 70° C. to 200° C., to remove all uncombined or free moisture not existing as water of crystallization. Depending on the temperature, it will take from 24 to 72 hours for the drying. The drying, if desired, may be accomplished under atmospheric conditions, but oven drying is preferred because it is faster. Should the material tend to stick in the molds upon removal therefrom, the molds may be first greased with any suitable substance such as petroleum grease.

Even though there is no shrinkage of the material in the molds, it may be desirable to mill or trim the surfaces of the dry product so as to provide an attractive product not marred with surface imperfections. Not over 10% of the product need be removed by such milling, whereas with products produced by other methods wherein molding under pressure is required, the amount of product removed by milling runs from 30% to 40%. The milled off material is not entirely waste material because it may be used for making magnesia insulating cement. However, it has less value as a cement and therefore results in an economic loss. Hence, because of the lesser amount of material which need be trimmed from the block or slab of the invention, a further economy is effected. Because of the setting of the product of the invention, in a quiescent state with substantially no shrinkage, the molds may be made of special shapes so as to form correspondingly shaped articles such as insulating fittings.

Although the product or composition of the invention contains calcium carbonate, in which all of the calcium originating from the source of dolomitic material exists, it is still light enough to permit incorporation therewith of the usual foreign materials employed in magnesium carbonate insulating products. For example, asbestos fiber, usually employed for reinforcing purposes, may be incorporated in the slurry containing the calcium carbonate precipitate and the carbonate of magnesium crystals. Also, diatomaceous earth may be incorporated in the slurry for the purposes of enabling the product to withstand higher temperatures.

Standard commercial preparations of magnesium carbonate insulating blocks produced by other methods contain about 85% by weight of magnesium carbonate as a bonding agent and about 15% by weight of asbestos fiber to reinforce the product. Under present standards, such blocks weigh from 16 to 18 lbs. per cubic foot; the specific gravity, therefore, ranges from about 0.256 to 0.288. The product of the invention containing the same percentage of asbestos fiber, and in which calcium carbonate is not eliminated, or in other words, contains all of the calcium occurring in the source of dolomitic material, as a carbonate, can be made to weigh about 12 to 16 lbs. per cubic foot; the specific gravity, hence, ranging from about 0.192 to 0.256. In addition to lightness, the dolomitic product of the invention possesses greater strength and has higher insulating efficiency than the product produced by other commercial methods even though, in such other methods, the calcium compounds are eliminated from the source of dolomitic material. For example, a block of the invention weighing about 14 lbs. per cubic foot is stronger than a 16 lb. per cubic foot block produced by other commercial methods involving mechanical pressure and from which calcium carbonate is eliminated. Yet such block of the invention will have about a 25% greater insulating efficiency.

By virtue of the extremely light weight of the composition, it is highly porous, i. e., cellular in structure, which is one of the factors contributing toward its heat insulating efficiency. Furthermore, although the composition is shaped, it is not stony or rock like in appearance as are artificial stones or natural rocks such as the original dolomitic material from which it is essentially derived, but is chalk-like in character. In other words, compared to an artificial stone or natural rock, it is relatively crushable, and the material may be readily rubbed off from the surface thereof.

If, in other commercial processes employing dolomitic material as the source of raw material, the calcium compounds were not removed, then the final product would weigh too much to meet commercial specifications because of the material shrinkage which occurs during the molding, and the mechanical pressure necessary to effect molding, which mechanical pressure compacts the product. Also, such product would be very fragile; and because of increased density imparted by the calcium carbonate, would have unsatisfactory insulating efficiency.

From the preceding description, it is seen that one of the important features of the method resides in the formation, in the aqueous suspension of the calcined dolomitic material, of the carbonate of magnesium crystals having the self-setting properties, which, because of such self-setting properties, allow the calcium carbonate derived from the dolomitic material to remain in the final product without impairing its efficiency compared to products compacted by pressure molding and in which calcium carbonate is eliminated by necessity. The preferred process for obtaining such crystals will now be described.

Dolomite, which contains magnesium carbonate and calcium carbonate in the ratio of about 40 to 60, respectively, or any other dolomitic limestone, is first calcined in the usual manner to prepare oxides of these metals. As a result of the calcining, carbon dioxide gas is evolved, which may be subsequently used in the process during the gassing operation. However, if the plant does not have calcining facilities but purchases the calcined dolomitic material, stack gas or any other suitable carbon dioxide-containing gas may be employed during the gassing for carbonating purposes.

A comparatively dilute aqueous suspension of magnesium and calcium hydroxides is then prepared by slaking and mixing the calcined dolomitic material with water, preferably in the proportions of about 20 parts of water by weight to 1 part of the calcined dolomitic material by weight, although the proportions may vary widely from about 10 to 40 parts of water by weight to 1 part of the dolomitic material by weight. Too little water impedes the reaction of the magnesium compounds in the vehicle, with the carbon dioxide-containing gas, while too much water may be impractical as it involves the problem of subsequent separation of the water from the slurry containing the calcium carbonate and the carbonate of magnesium crystals. Also, upon introduction of the carbon dioxide-containing gas into the suspension, an exothermic carbonation reaction occurs; and for reasons subsequently related, it is desirable to prevent too high a reaction temperature. Therefore, the quantity of water should be sufficient to absorb as much of the heat of the gassing reaction as is practically possible. At the same time, it may be preferable to employ an outside cooling medium to prevent too high a heat of reaction. The preferred proportions of water are those which permit the optimum rate of reaction without undue creation of heat, and still provide a minimum quantity which is to be subsequently removed. Of course, the proportions may vary in accordance with the carbon dioxide concentration in the gas as well as the character of the dolomitic material.

Carbon dioxide-containing gas is next introduced into the aqueous suspension of the magnesium and calcium hydroxides, preferably into an open tank or vessel which contains the suspension. The calcium hydroxide has a greater affinity for the carbon dioxide than the magnesium hydroxide. As a result, the first reaction which occurs is the precipitation of water insoluble calcium carbonate which after once precipitated is not redissolved upon continued gassing.

After precipitation of the calcium carbonate, two major reactions occur, namely, the formation of water soluble magnesium bicarbonate and the formation of an insoluble carbonate of magnesium. These reactions are controlled more or less by temperature conditions, and the length of time of gassing. If the temperature is too low, the formation of the bicarbonate is favored. If the temperature is too high, the rate of reaction is too slow for commercial practicability.

As it is desired to produce the comparatively fine or thin, needle-like carbonate of magnesium crystals having the self-setting properties, the temperature for the precipitation of the carbonate of magnesium crystals should be maintained above the point below which the formation of magnesium bicarbonate is favored, because the presence of too great a quantity of the bicarbonate in the final gassed composition retards the setting properties of the carbonate of magnesium crystals. A suitable temperature range is between about 20° C. and 40° C., preferably at about 30° C. Since the reaction involved is exothermic, some cooling will probably be necessary to maintain this temperature range, depending upon the rate of reaction and the amount of water. In order to enhance the reaction and produce small size carbonate of magnesium crystals for the reasons previously explained, vigorous agitation is preferable. Mechanical agitation may be employed. However, it is preferred to effect the agitation through the introduction of the carbon dioxide containing gas with or without additional agitation.

The presence of magnesium in form other than the crystal form impairs the setting properties of the composition. Therefore, a maximum yield of the carbonate of magnesium crystals should be obtained, after the calcium carbonate has been precipitated. To insure this maximum yield or complete carbonation of substantially all the magnesium in the form of the insoluble crystalline carbonate precipitate, over-gassing which results in the formation of the water soluble bicarbonate is avoided as much as possible; and the gassing is continued until the resulting precipitate of the carbonate of magnesium crystals starts to go into solution as magnesium bicarbonate, or, in other words, to a point not substantially beyond incipient solution of the carbonate of magnesium crystals.

At this end point, substantially all of the magnesium will be precipitated in the crystalline form, but upon continued or over-gassing a major reaction then occurs between the carbonate of magnesium and carbonic acid to form the undesirable water soluble magnesium bicarbonate. This end point can be determined by observation of the operator, and by chemical titration of selected samples because as the amount of bicarbonate increases beyond the end point, the amount of acid required to neutralize filtered samples from the batch increases. By slight over-gassing or carbonating slightly beyond the end point or, in other words, until the resulting carbonate of magnesium crystalline precipitate starts to go into solution, substantially complete carbonation is insured. If the gassing has been carried out too far beyond the desired end point, and if the composition has not been excessively over-gassed, the relatively small amount of the water soluble magnesium bicarbonate can be neutralized by the addition of magnesium oxide, to reprecipitate the desired carbonate of magnesium crystals from the magnesium bicarbonate in solution.

It is to be noted that in other commercial processes, the aqueous suspension of the calcined dolomitic material is completely overgassed. In other words, the gassing is carried on to convert all of the magnesium carbonate to the water soluble magnesium bicarbonate to permit separation of the calcium carbonate. Magnesium carbonate is subsequently precipitated from the bicarbonate solution by application of heat which in the process is avoided, as it destroys or impairs the self-setting properties of the carbonate of magnesium crystals. To facilitate this over-gassing in the other processes, gases containing relatively high percentages of carbon dioxide are employed to enhance the formation of the bicarbonate. Also, to enhance formation of the bicarbonate, the gas in such other processes is introduced into a closed vessel or tank which is consequently under pressure. It is known that the bicarbonate solution formation is favored by pressure. Since over-gassing is to be avoided in the process, gases containing much lower percentages of carbon dioxide and even stack gases which contain a low carbon dioxide content, may be employed in the process. Low carbon dioxide content gases cannot be employed in the other processes with practicability. Also, since over-gassing is avoided in the process, there is no necessity of gassing in a closed vessel under pressure and, as previously related, there is employed an open vessel during the gassing or carbonation. These facts result in further economy. Since the process permits the use of low content carbon dioxide-containing gas, in percentages as low as 6% by weight, this enhances the desired excess agitation to produce the desired type of carbonate of magnesium crystals, because a greater volume of gas has to be introduced to complete the reaction, compared to the volume which would be required when employing a concentrated gas which in other processes has run as high as 100% carbon dioxide.

After the introduction of carbon dioxide has been stopped at the desired point, the aqueous mixture containing the precipitated calcium carbonate and the carbonate of magnesium crystals, is allowed to stand, in a relatively quiescent state, for about an hour or two without application of heat which, as previously related, affects the setting properties of the carbonate of magnesium crystals if applied prior to the setting. During this period, the precipitate settles as a slurry or sludge, and a water layer forms at the top. Such layer of water starts to collect substantially immediately after the gassing is completed. The small quantity of magnesium bicarbonate in solution formed by the slight over-gassing, is converted to the carbonate of magnesium crystals by its own decomposition and by reaction with any existing small quantity of minute particles of magnesium hydroxide which might not have reacted during the gassing.

The resulting mass will be substantially neutral, and the precipitate will consist essentially of calcium carbonate intermixed with needle-like crystals of a carbonate of magnesium which produces the set. After standing for the desired time to allow settling of the slurry or sludge, excess water which collects above the slurry or sludge may be drained, or removed in any other suitable manner, such as by filtration; the amount of water in the slurry, as controlled by the quantity of excess water removed, determining the density of the final product inasmuch as the composition does not shrink on setting. The slurry at this point is ready for use in the preparation of the final product, such as heat insulating material, without further treatment except that occurring during the setting thereof. In this connection, the setting is carried out in the manner previously related, care being taken to avoid application of heat prior to the setting.

Analysis under the microscope reveals that the thin or fine needle-like carbonate of magnesium crystals which provide the self-setting composition of the invention, will vary in size from 20 to 50 microns in length and from 2 to 5 microns in thickness. In other processes, involving carbonation of magnesium compounds, crystals are formed but because of lack of vigorous or excessive agitation, they are much larger in size. However, such crystals are altered or transformed prior to molding, by subsequent steps of the processes, such as by application of heat prior to molding. In the method of the invention, the product or composition containing calcium carbonate intermixed with the thin, needle-like crystals of a carbonate of magnesium, is cast or poured directly into open molds or forms, to set, in a quiescent state, in the manner previously explained.

The aqueous slurry prepared as above described and containing substantially all the magnesium as a carbonate in the form of described crystals, and also the calcium carbonate, may be cast or poured into the molds as such, but in view of the light weight, strength, insulating properties, and setting properties of the final product, other materials desirable for incorporation in the manufacture of insulating materials, may be intermixed with the slurry. Preferably, if this is done, such other materials are introduced into the slurry prior to the removal of excess water for adjusting or controlling the water content. In some cases, it might be desirable to even add water to such slurry where the other material absorbs in itself a lot of water. Usually, foreign materials, such as asbestos or diatomaceous earth, which will not detract materially from the heat insulating properties of the final product, are incorporated in the slurry. Upon setting, the carbonate of magnesium serves as the bonding agent for the foreign material incorporated therewith, as well as for the calcium carbonate. The slurry to which any of the above types of foreign materials may have been added and after the water content is adjusted or controlled, is poured into molds and allowed to set in a quiescent state in the manner already explained.

After setting and drying, the resulting product, although containing a very high proportion of calcium carbonate, is found to have, as was previously related, a higher mechanical strength and a lighter weight than the materials previously made from magnesium carbonate alone. This is so, even though all the calcium occurring as a calcium compound in the original source of dolomitic material, remains in the final product as calcium carbonate. Although the described process is preferred, it may be varied, as will be apparent to those skilled in the art from the teachings of the invention, in accordance with the character of raw material employed, the concentration of gas, the amount of water in the aqueous suspension, etc. It is only important that all of the magnesium compounds in the aqueous slurry be converted to the fine, needle-like carbonate of magnesium crystals, which it has been found will set hydraulically to bond the calcium carbonate and thereby provide the improved product of the invention, and that these crystals be not subsequently destroyed during further steps of the process; the factors pointed out above facilitating obtaining the desired type of crystals.

What is claimed is—

1. A composition derived essentially from dolomitic material and having self-setting properties comprising a slurry in which the major portion of the solid materials are calcium and magnesium compounds, the calcium compound in such slurry being calcium carbonate, and substantially all of the magnesium in such slurry being in the form of a crystalline carbonate of magnesium having self-setting properties.

2. The step in the method of producing from dolomitic material a composition having self-setting properties which comprises carbonating a suspension containing calcined dolomitic material to convert substantially all of the magnesium containing substance in such suspension to a carbonate of magnesium in crystalline form possessing self-setting properties.

3. The method of producing from dolomitic material a composition having self-setting properties which comprises carbonating an aqueous vehicle containing calcined dolomitic material to form water insoluble calcium carbonate and to convert substantially all of the magnesium containing substance in such vehicle to a water insoluble carbonate of magnesium in crystalline form, terminating the carbonation when substantially all the magnesium containing substance has been thus converted, and enhancing the setting by applying heat to a slurry containing said calcium carbonate and said crystalline carbonate of magnesium.

4. The method of producing from dolomitic material a composition having self-setting properties which comprises carbonating under agitation an aqueous vehicle containing calcined dolomitic material to convert substantially all of the magnesium containing substance in such vehicle to a carbonate of magnesium in crystalline form possessing self-setting properties, providing a desired density slurry of calcium carbonate derived essentially from said dolomitic material and said carbonate of magnesium by adjusting the water content of such slurry, casting said slurry into a form, and heating the slurry in the form to enhance setting of the composition.

5. The step in the method of producing a composition derived essentially from dolomitic material and set independent of application of pressure thereto which comprises heating a formed slurry containing calcium carbonate and a carbonate of magnesium in crystalline form having self-setting properties.

6. The method of producing a set composition from dolomitic material which comprises treating with carbon dioxide-containing gas an aqueous vehicle containing the calcined dolomitic material to precipitate calcium carbonate, controlling the conditions of treatment to convert substantially all of the magnesium containing substance in said vehicle to a self-setting carbonate in crystalline form, and heating in a quiescent state a slurry containing both said calcium carbonate and said crystalline carbonate of magnesium until it sets to a firm cake.

7. The method of preparing insulating material from dolomitic material as the source which comprises gassing an aqueous suspension of the calcined dolomitic material with carbon dioxide-containing gas to precipitate first calcium carbonate, continuing the gassing to precipitate next a carbonate of magnesium, controlling conditions of temperature to avoid formation of magnesium bicarbonate, stopping the gassing substantially at the time when incipient solution of said carbonate of magnesium to the bicarbonate occurs to obtain substantially a maximum yield of said carbonate of magnesium precipitate in the form of needle-like crystals having self-setting properties, removing excess water, casting the resulting slurry of the calcium carbonate and the carbonate of magnesium into a mold, applying heat to such slurry in the mold while in a quiescent state to effect setting of the slurry to a firm cake independent of application of pressure thereto, and subsequently drying said set cake.

8. The method of preparing a set composition from dolomitic material as the source which comprises carbonating a relatively dilute aqueous suspension of the calcined dolomitic material to precipitate calcium carbonate, continuing the carbonation to precipitate a carbonate of magnesium, maintaining the temperature of reaction above the temperature below which the formation of magnesium bicarbonate is favored and below the temperature above which the reaction proceeds too slowly, terminating the carbonation substantially at the time when incipient solution of said carbonate of magnesium to the bicarbonate occurs to obtain substantially a maximum yield of said carbonate of magnesium precipitate in the form of relatively thin needle-like crystals having self-setting properties, removing excess water to provide a slurry of the desired density, prior to any application of heat to such slurry casting it into a mold without removing the calcium carbonate therefrom, applying heat to such slurry in the mold while in a quiescent state and without application of pressure thereto to effect setting of the slurry to a firm cake, and subsequently drying the cake.

9. The method of producing from dolomitic material a composition having self-setting properties which comprises carbonating an aqueous suspension containing calcined dolomitic material to form calcium carbonate and to convert substantially all of the magnesium substance in such suspension to a carbonate of magnesium in crystalline form possessing self-setting properties, incorporating in said carbonated suspension foreign material of the class consisting of asbestos and diatomaceous earth to impart desired properties to the final product, providing a desired density slurry by adjusting the water content, and setting such slurry to a firm cake by applying heat thereto.

10. A light weight cellular chalk-like composition capable of use as a heat insulating material containing modified dolomitic material in which substantially all of the calcium in the original dolomitic material is present as calcium carbonate and which is bonded by a magnesium compound derived from needle-like crystals of a carbonate of magnesium having self-setting properties, said magnesium bonding compound containing magnesium derived from said original dolomitic material.

11. A light weight cellular chalk-like composition set substantially without shrinkage independent of application of pressure and capable of use as a heat insulating material, containing fiber to reenforce the composition, and modified dolomitic material in which substantially all of the calcium in the original dolomitic material is present as calcium carbonate and which is bonded by a magnesium compound derived from needle-like crystals of a carbonate of magnesium having self-setting properties, said magnesium bonding compound containing magnesium derived from said original dolomitic material.

DOROTHY H. GRUNWALD,
*Administratrix with the Will Annexed of the Estate of Bertrand B. Grunwald, Deceased.*